Figure 1:
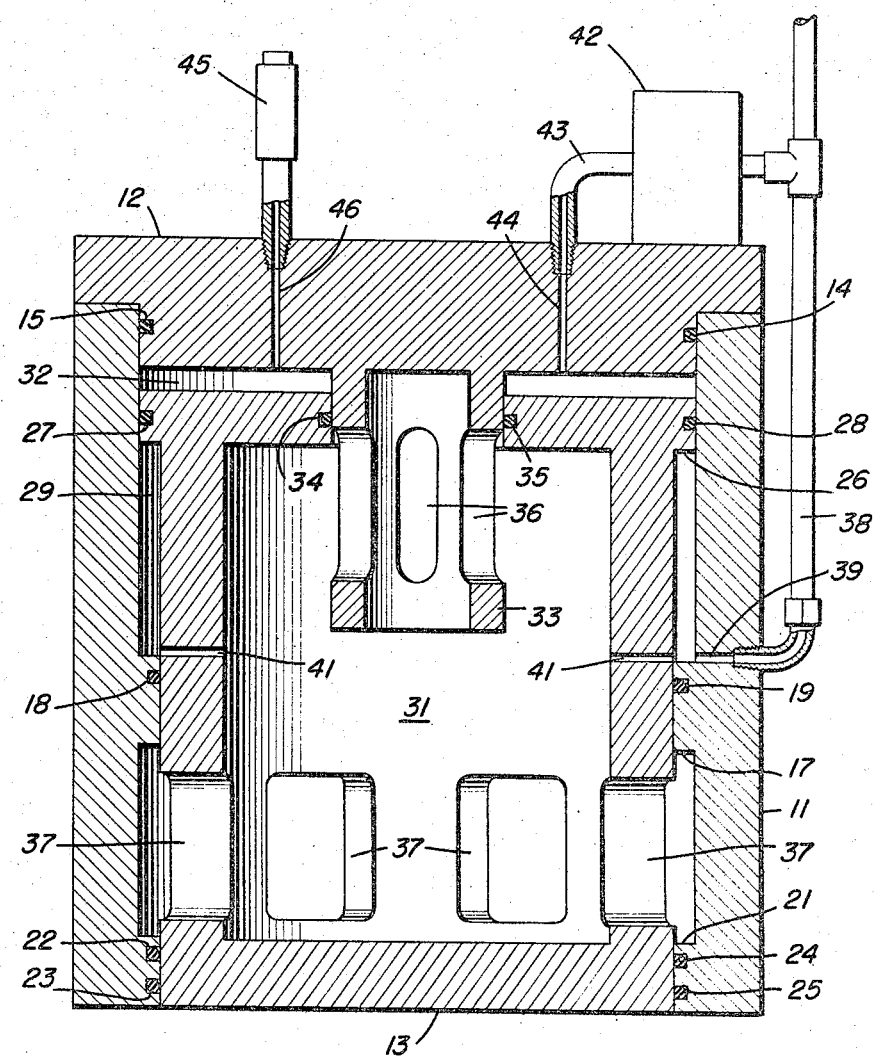

April 23, 1968   J. W. BROOKS   3,379,272
PNEUMATIC EXPLOSION GENERATOR (PEG)
Filed Nov. 26, 1965   2 Sheets-Sheet 2

INVENTOR
James W. Brooks
BY
ATTORNEY
AGENT

United States Patent Office 3,379,272
Patented Apr. 23, 1968

3,379,272
PNEUMATIC EXPLOSION GENERATOR (PEG)
James W. Brooks, Silver Spring, Md., assignor to the United States of America as represented by the Secretary of the Navy
Filed Nov. 26, 1965, Ser. No. 510,454
6 Claims. (Cl. 181—.5)

The invention described herein may be manufactured and used by or for the Government of the United States of America for governmental purposes without the payment of any royalties thereon or therefor.

This invention relates generally to acoustic transducers, and more particularly to a sound source for producing high energy acoustic pulses underwater by means of pneumatic explosions.

There has been a need, in connection with the tracking of submarines, for a sound source that will produce high energy acoustic pulses under water and that can be easily mounted on the hull of a submarine. A number of methods of producing high energy pulses are known in the art. These include underwater chemical explosions, high energy spark gaps, electromechanically driven diaphragms, and underwater pneumatic explosions. The problems associated with handling, fuzing, and launching chemical explosives from a submarine all but preclude their use except in very special applications. Moreover, there are other disadvantages attendant to the use of chemical explosives as an underwater sound source. For example, explosions of gas mixtures are for the most part limited to shallow water. The other enumerated methods of sound pulse generation are generally safer and simpler than chemical explosions and, unlike them, can be made repetitive. Of the other methods, spark gaps have not proved to be a satisfactory source of high intensity sound for submarine applications. Electromechanically driven diaphragms present considerable problems in energy transfer from the mechanical system to the fluid media. Furthermore, sound waves created by vibrating diaphragms energized by magnetostrictive or piezoelectric devices, which is the usual practice, are very high frequency and generally not suitable for use in conjunction with narrow band detection systems. The pneumatic explosion thus remains to be considered as a possible sound source. A pneumatic explosion generator does in fact offer several significant advantages as applied to use in tracking submarines. In addition to producing the required acoustic output, the pneumatic source and auxiliary equipment is simpler than conventional magnetostrictive and piezoelectric transducers and their auxiliary equipment for low frequency sound pulse generation. A peculiar feature of pneumatic sound sources is that acoustic level and frequency content can be varied over a wide range by varying the chamber pressure and volume, whereas for example, in the case of chemical explosives these parameters are a function of the charge weight, charge composition and depth at which the charge is fired. Existing pneumatic explosion generators, however, have not proved to be entirely satisfactory for the reason that considerable problems have been encountered in providing adequate and reliable pneumatic seals which will withstand the high pressures involved and also survive the sea water environment to which they are subjected. Further, while existing pneumatic sound sources are generally simpler than other prior art underwater acoustic generators, it is desirable that an even simpler device be made to increase reliability and decrease the cost of production.

It is therefore an object of the instant invention to provide a pneumatic explosion generator which is simple in construction and requires a minimum of auxiliary equipment for remote control, repetitive operation.

It is another object of this invention to provide an acoustic sound source useful in connection with the tracking of submarines at considerable depths which produces repetitive pneumatic explosions of considerable amplitude and which is simple in construction and reliable in operation.

It is a further object of the invention to provide an underwater acoustic generator which creates high intensity sound pulses by pneumatic explosions and obviates the sealing problems heretofore associated with such devices.

According to the present invention, the foregoing and other objects are attained by providing a piston operatively associated with a plurality of chambers within a piston housing, means for supplying air under pressure to one of the chambers for driving the piston in one direction until two of the chambers reach the supply pressure, and a triggering electric solenoid valve for admitting air into another chamber to move the piston in the opposite direction until exhaust ports from one of the pressurized chambers are exposed without the device so that air therein is expelled rapidly enough to form an explosion. Recycling of the device is effected by the potential energy stored in the compressing of air trapped within one of the chambers during movement of the piston in the opposite direction, which serves to return the piston to its initial position. The configuration of the device is such that all static and dynamic seals are made with standard circular-cross-section sealing rings and, since pressure is applied radially instead of axially, no pressure threshold is required for sealing. O-rings made of polytetrafluoroethylene and sold under the trademark Teflon are used which permits sealing at high pressures and also allows the seals to serve as bearing surfaces for the piston thus permitting the entire device to be made of a single corrosion-resistant steel.

Figure 2:
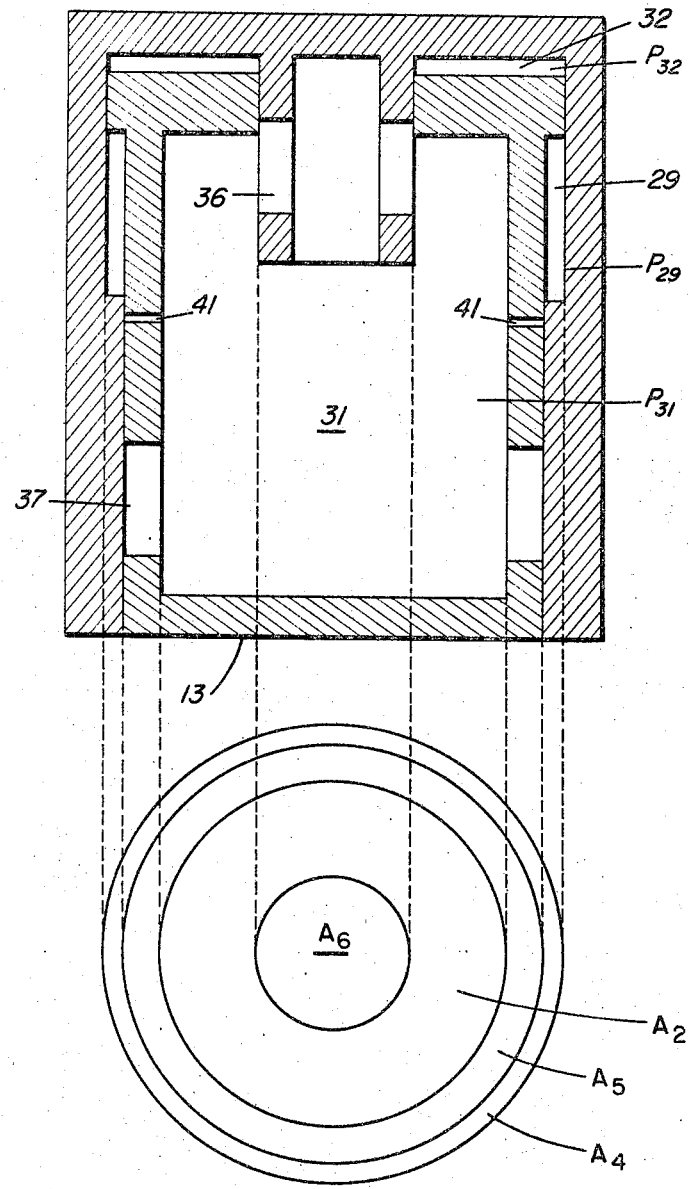

The specific nature of the invention, as well as other objects, aspects, uses and advantages thereof, will clearly appear from the following description and from the accompanying drawing, in which:

FIG. 1 is a cross-sectional view of a pneumatic explosion generator according to the invention; and FIG. 2 is a simplified cross-sectional view of the generator shown in FIG. 1 which serves to better illustrate the cross-sectional areas of the several chambers.

Referring now to the drawing, and more particularly to FIG. 1, the pneumatic explosion generator shown comprises only three basic structural parts: a two-part housing, including cylinder 11 and a cylinder head 12 fixedly attached to the top of cylinder 11, and a piston 13. A rubber O-ring 14 in compressional engagement between the surface of an annular groove 15 in cylinder head 12 and the inner surface of cylinder 11 provides a seal between the cylinder 11 and cylinder head 12. Obviously, an integral one-piece structure of a cylinder and cylinder head which would eliminate the requirement of a seal such as O-ring 14 could be used with equal effect. The two-piece structure shown has the advantage of simplifying the construction of the device. Cylinder 11 has a circular shoulder 17 on its interior surface positioned midway longitudinally along the axis of the cylinder. Shoulder 17 has a groove 18 cut therein which supports a Teflon O-ring 19. Another interior circular shoulder 21 is positioned at the bottom of cylinder 11. Shoulder 21 has two grooves 22 and 23 cut therein which support Teflon O-rings 24 and 25, respectively. Piston 13 is slideably positioned within cylinder 11 and engages Teflon O-rings 19, 24 and 25 about its entire circumference. Piston 13 has at its top an outwardly projecting shoulder 26 having an annular groove 27 cut therein which carries a rubber O-ring 28 in compressional engagement with the interior surface of cylinder 11. Shoulders 17 and 26 and the surfaces of cylinder 11 and piston 13 therebetween define a first chamber 29. Piston 13 is hollow and closed at its bottom and defines a second chamber 31. A third chamber 32 is defined by the top of piston 13 and cylinder head 12. A hollow, cylindrical valve body 33 integral with cylinder head 12 and open at its bottom extends downwardly into cylinder 11 and is axially aligned therewith. Valve body 33 passes through the top of piston 13 and is engaged by a Teflon O-ring 34 supported in a groove 35 cut in the surface defining the opening in the top of piston 13. A plurality of equalizer ports 36 are cut through valve body 33 longitudinally part way along the length thereof at equal intervals about its circumference beginning near the bottom. A plurality of exhaust ports 37 are cut through the wall of piston 13 near its bottom and provide communication between chamber 31 and the fluid medium outside the device when piston 13 is driven to its downwardmost position. Compressed air is supplied to chamber 29 through conduit 38 by way of port 39 in cylinder 11. Ports 41 cut through the wall of piston 13 about midway along the longitudinal axis thereof permit the pressures in chambers 29 and 31 to equalize when the piston is in its uppermost position. Compressed air is selectively supplied to chamber 32 through electric solenoid valve 42 and conduit 43 by way of port 44 in cylinder head 12. There is additionally provided a relief valve 45 in cylinder head 12 which communicates with chamber 32 by way of port 46.

The operation of the device may be seen from the following description. Initially, electric solenoid valve 42 is closed. Compressed air from a supply (not shown) enters chamber 29 through port 39 driving piston 13 upward. As piston 13 moves upward, exhaust ports 37 slide past Teflon O-rings 24 and 25 to seal the bottom end of chamber 31. Then Teflon O-ring 34 slides over equalizing ports 36 to seal access between chambers 31 and 32. Piston 13 continues to move slowly as air trapped in chamber 32 leaks out through one-way relief valve 45. Toward the end of the stroke, ports 41 slide over Teflon O-ring 19. Air is then permitted to flow into chamber 31 through chamber 29 until both chambers reach the supply pressure. The generator is triggered by opening electric solenoid valve 42 and admitting air into chamber 32. Piston 13 begins to move downward until the Teflon O-ring 34 slides past the equalizing ports 36. The pressure in chamber 32 rapidly becomes equal to that in chamber 31, and piston 13 is driven out with an initial force equal to $$F_o = (P_{31} - P_H) \times (\text{cross-sectional area of piston})$$

where $P_H$ is ambient pressure and $P_{31}$ is the pressure in chamber 31. This force for one of the embodiments constructed was 50,000 pounds. Such a force imparts extremely high accelerations to the piston. The relative positions of O-rings 34 and 24 and 25 are such that piston 13 travels a short distance with equalizing ports 36 open so that when exhaust ports 37 slide past O-rings 24 and 25, they do so with high velocity, and air is expelled rapidly enough to form an explosion. During the downward stroke, ports 41 pass over Teflon O-ring 19, and air is trapped in chamber 29. This trapped air forms a cushion which permits piston 13 to slow without metal-to-metal impact of shoulders 17 and 26. The potential energy stored in the compressing of this trapped air serves to return piston 13 to a position where ports 41 are again opened and the entire cycle can be repeated.

Relief valve 45 is required for two reasons: (1) to allow air in chamber 32 to bleed down to ambient pressure, and (2) to prevent pressure in chamber 32 from building up over long periods due to leakage caused by wear of Teflon O-ring 34 and thereby causing spurious self-triggering of the pneumatic explosion generator. In order for the generator to be triggered reliably, the flow rate through solenoid valve 42 has to be larger than the flow rate through the relief valve 45.

Reference is now made to FIG. 2 of the drawing which is helpful in visualizing the geometrical relationships from which the following statement of static forces involved just before and just after triggering is developed. Let $P_H$ be the ambient pressure and $P_{29}$, $P_{31}$ and $P_{32}$ be pressures in chambers 29, 31 and 32, respectively. Areas $A_2$, $A_4$, $A_5$, and $A_6$ are defined in FIG. 2. The force tending to drive the piston upward may be expressed as follows:

$$F_u = P_H(A_2 + A_5 + A_6) + P_{29}A_4 + P_{31}A_2$$

Similarly, the downward force is expressed as follows:

$$F_D = P_{32}(A_2 + A_4 + A_5) + P_{31}(A_2 + A_6)$$

For the piston to remain up, $F_u$ must be greater than $F_D$, or $$P_H(A_2 + A_5 + A_6) + P_{29}A_4 + P_{31}A_2 > P_{32}(A_2 + A_4 + A_5) + P_{31}(A_2 + A_6)$$

Before the generator is triggered, chamber 32 bleeds down to ambient pressure through the relief valve (45 in FIG. 1), i.e. $P_{32} = P_H$, and the inequality reduces to $$P_{29}A_4 - P_{31}A_6 > P_H(A_4 - A_6)$$

When chamber 31 fills from chamber 29 through ports 41, $P_{31} = P_{29}$, and the inequality reduces further to $$P_{31}(A_4 - A_6) > P_H(A_4 - A_6)$$

or $$A_4(P_{31} - P_H) > A_6(P_{31} - P_H)$$

This means that if the pneumatic explosion generator is designed so that $A_4$ is greater than $A_6$, then for $P_{31} = P_{29}$, it cannot be self-triggering. In order to trigger the generator, air is admitted into chamber 32 from the supply by opening the solenoid valve (42 in FIG. 1). As the equalizing ports 36 open and $P_{32} = P_{31}$, the resultant force on the piston suddenly becomes $$\begin{aligned}F_o &= F_D - F_u \\ &= P_{31}(A_2 + A_4 + A_5) + P_{31}(A_2 + A_6) \\ &\quad - P_H(A_2 + A_5 + A_6) - P_{29}A_4 - P_{31}A_2 \\ &= (P_{31} - P_H)(A_2 + A_5 + A_6) - A_4(P_{29} - P_{31})\end{aligned}$$

For $P_{29} = P_{31}$, this reduces to $$F_o = (P_{31} - P_H)(A_2 + A_5 + A_6)$$

or $$F_o = (P_{31} - P_H) \times (\text{cross-sectional area of piston 13})$$

If ports 41 are blocked so that $P_{29} \neq P_{31}$, then the condition for closure just prior to triggering is $$P_{29}A_4 - P_{31}A_6 > P_H(A_4 - A_6)$$

It may be seen that for this mode of operation, since $A_4 > A_6$ by design, the main chamber 31 will remain closed if $P_{29} > P_{31}$ (assuming that $P_{31}$ and $P_{29}$ exceed $P_H$). If $P_{29}$ is held fixed and $P_{31}$ is increased, a point will be reached where the source will be self-triggering.

It will be apparent that the embodiment shown is only exemplary and that various modifications can be made in construction and arrangement within the scope of the invention as defined in the appended claims.

I claim as my invention:

1. A pneumatic explosion generator for producing repetitive, high energy acoustic pulses underwater, comprising:

a housing having a cylinder and a cylinder head, a hollow, cylindrical piston slideably positioned within said cylinder, said piston having a plurality of exhaust ports cut through its sidewall near its bottom end, a portion of the exterior wall of said piston and the adjacent interior wall of said cylinder defining a first chamber, the interior of said piston defining a second chamber, and the top of said piston and said cylinder head defining a third chamber, means for supplying air under pressure to said first chamber for driving said piston in an upwardly direction, port means for providing communication between said first chamber and said second chamber when said piston is in its uppermost position, and trigger means for admitting air into said third chamber to move said piston in a downwardly direction until said exhaust ports are exposed outside of said housing thereby causing the air within said second chamber to be expelled rapidly enough to form an explosion, said piston being restored to its uppermost position within said housing by the potential energy stored in the compressing of air trapped within said first chamber during the downward movement of said piston whereby said generator may be recycled by actuating said triggering means.

2. A pneumatic explosion generator as recited in claim 1 further comprising an equalizing valve having a hollow, cylindrical valve body integral with said cylinder head and extending downwardly into said cylinder and axially aligned therewith, said valve body passing through the top of said piston and having a plurality of equalizer ports cut through its sidewall longitudinally part way along the length thereof beginning near the bottom, said equalizer ports providing communication between said second chamber and said third chamber after said piston has moved in a downwardly direction a short distance thereby causing the downward force acting on said piston to be suddenly increased resulitng in said piston attaining a very high downward velocity as said exhaust ports are exposed outside of said housing.

3. A pneumatic explosion generator as recited in claim 2 wherein the cross-sectional area of said first chamber is greater than the cross-sectional area of said valve body to prevent the possibility of spurious self-triggering.

4. A pneumatic explosion generator as recited in claim 3 further comprising a one-way relief valve in said cylinder head and communicating with said third chamber to allow air in said third chamber to bleed down to ambient pressure during the upward movement of said piston.

5. A pneumatic explosion generator as recited in claim 4 wherein the upper portion of the interior surface of said cylinder is relieved to form a shoulder positioned midway longitudinally along the axis of said cylinder, said shoulder having a first groove cut therein, a first sealing O-ring supported in said first groove end engaging said piston about its circumference, the surface defining the opening in the top of said piston through which said valve body passes having a second groove cut therein, and a second sealing O-ring supported in said second groove and engaging said valve body about its circumference, said O-rings additionally acting as bearing surfaces for said piston and said valve body.

6. A pneumatic explosion generator as recited in claim 5 wherein said first and second sealing O-rings are made of polytetrafluoroethylene.

No references cited.

BENJAMIN A. BORCHELT, *Primary Examiner.*

W. KUJAWA, *Assistant Examiner.*